United States Patent [19]

Edwards et al.

[11] Patent Number: 5,102,530
[45] Date of Patent: Apr. 7, 1992

[54] CRACKING CATALYSTS WITH OCTANE ENHANCEMENT

[75] Inventors: Grant C. Edwards, Silver Spring; Alan W. Peters, Rockville, both of Md.

[73] Assignee: W. R. Grace & Co.-Conn., New York, N.Y.

[21] Appl. No.: 435,213

[22] Filed: Nov. 13, 1989

Related U.S. Application Data

[62] Division of Ser. No. 842,519, Mar. 21, 1986, Pat. No. 4,898,846.

[51] Int. Cl.$^5$ ............................................. C10G 11/00
[52] U.S. Cl. ..................................... 208/120; 208/16; 208/106
[58] Field of Search .................................. 208/79, 120

[56] References Cited

U.S. PATENT DOCUMENTS

| | | | |
|---|---|---|---|
| 4,021,331 | 5/1977 | Ciric | 208/120 |
| 4,357,265 | 11/1982 | Chiang | 208/120 |
| 4,415,439 | 11/1983 | Chiang | 208/120 |
| 4,481,104 | 11/1984 | Walsh | 208/120 |
| 4,740,292 | 4/1988 | Chen et al. | 208/120 |
| 4,784,749 | 11/1988 | Chang et al. | 208/120 |
| 4,788,378 | 11/1988 | Chang et al. | 208/120 |
| 4,826,586 | 5/1989 | Herbst et al. | 208/120 |
| 4,834,867 | 5/1989 | Gilson | 208/120 |
| 4,840,930 | 6/1989 | La Pierre et al. | 502/79 |
| 4,855,036 | 8/1989 | Chiang et al. | 208/120 |
| 4,911,823 | 3/1990 | Chen et al. | 208/120 |
| 4,964,406 | 11/1990 | Mizrahi et al. | 208/120 |

FOREIGN PATENT DOCUMENTS 186447  2/1986  European Pat. Off. .

Primary Examiner—Helane E. Myers
Attorney, Agent, or Firm—Edward J. Cabic

[57] ABSTRACT

Cracking catalysts which yield higher octane gasoline than conventional cracking catalysts are made with large pore size zeolites such as zeolite Beta and zeolite ZSM-20 in the low sodium, $H^+$ form. These zeolites are mixed with a matrix which contains at least a binder and formed into catalyst particles. These catalysts are especially suitable to be used in fluid catalytic cracking.

12 Claims, No Drawings

CRACKING CATALYSTS WITH OCTANE ENHANCEMENT

This is a division, of application Ser. No. 842,519, filed Mar. 21, 1986, now U.S. Pat. No. 4,898,846.

BACKGROUND OF THE INVENTION

1. Field of Invention

This invention relates to improved petroleum cracking catalysts and their method of use.

2. Description of the Previously Published Art

Modern automotive vehicles powered by conventional spark ignition, internal combustion engines are required by law to be equipped with catalytic converters to reduce emissions of hydrocarbons, carbon monoxide and nitrogen oxides in the engine exhaust stream. Formerly, before the introduction of catalytic converters, the octane number of the gasoline obtained by catalytic cracking of petroleum feedstocks was increased by the addition of reformates, alkylates, tetraethyl lead, and/or other octane improving metal and non-metal compounds.

Unfortunately, tetraethyl lead and other metal and non-metal additives for octane boosting or octane improvement of gasoline such as other lead compounds, manganese compounds, boron compounds, phosphorous compounds, etc., deactivate or poison the catalyst in the catalytic converters so that the converter cannot reduce the noxious emissions to acceptable levels. Therefore, such octane improvement compounds cannot be used to increase the octane number of gasoline suitable for vehicles equipped with catalytic converters. Gasolines suitable for vehicles equipped with catalytic converters are commonly termed "unleaded" or "non leaded" gasolines.

The recent increase in the commercial value of hydrocarbons such as reformate, alkylate, etc., which can be added to gasoline to increase its octane number, makes it desirable to sell such valuable chemicals separately as petrochemicals rather than to add them to gasoline to increase the octane number of gasoline.

Thus, both the requirement for unleaded gasolines with a good octane number for vehicles equipped with catalytic converters and the increase in value of reformates, alkylates, etc. for products other than gasoline have prompted the petroleum refining industry to employ novel cracking catalysts which yield a higher octane gasoline than that obtained by conventional cracking catalysts. Cracking catalysts are described in U.S. Pat. Nos. 3,994,800, 4,259,212, 4,324,698, 4,339,354 and 4,325,813 which produce higher octane gasoline than conventional cracking catalysts. They all employ some form of faujasite type Y zeolite.

U.S. Pat. Nos. 3,758,403, 3,894,931, 3,894,933, 4,309,279, and 4,309,280 disclose the use of zeolite Y admixed with zeolite ZSM-5 in the FCC catalyst particle or the use of a mixture of two FCC catalysts, one a conventional cracking catalyst using Y and the other using ZSM-5, or the use of a conventional FCC catalyst with finely powdered ZSM-5 added to the charge stock to make higher octane gasoline. U.S. Pat. No. 4,340,465 discloses the use of a FCC catalyst employing a mixture of Silicalite and rare earth exchanged Y to make a higher octane gasoline.

Zeolite Beta was disclosed in U.S. Pat. No. 3,308,069 and Re 28,341. Mention is made in U.S. Pat. No. 3,308,069 of the possible use of Beta in a variety of hydrocarbon conversion catalysts including catalytic cracking, columns 7–8, but not in FCC cracking. More specifically, the use of Beta has been described for hydrocracking, U.S. Pat. Nos. 3,923,641 and 4,486,296; for alkylation, U.S. Pat. Nos. 3,957,621, 3,948,758, and 4,301,316; for Diels Alder reaction, U.S. Pat. No. 4,384,153; for dewaxing, UK 2,141,733A, and dewaxing on Pt-Beta, U.S. Pat. No. 4,419,220; for isomerization, U.S. Pat. No. 4,518,485 and for conversion of syngas or Fischer Tropsch products into liquid hydrocarbon products, U.S. Pat. Nos. 4,471,145, 4,500,417, 4,543,347 or higher weight hydrocarbons, U.S. Pat. No. 4,476,330. All of these processes involve the use of moderate pressure of hydrogen to be present or involve hydrocarbon synthesis. Also, the use of Beta has been claimed for the conversion of olefins to aromatics, U.S. Pat. No. 4,465,884, and to higher molecular weight low pour point distillates, U.S. Pat. No. 4,430,516. A process has been disclosed for the use of USY, Beta or ZSM-20 exchanged with alkali ions at pH 7 as a component in an FCC catalyst with a high selectivity for distillate, U.S. Pat. No. 4,481,104.

3. Objects of the Invention

It is an object of the present invention to provide highly active zeolite containing hydrocarbon conversion catalysts.

It is a further object to provide cracking catalysts which yield higher octane gasoline than conventional cracking catalysts.

It is another object to provide zeolite containing cracking catalysts which are capable of efficiently and economically cracking hydrocarbon feedstocks using currently available conventional commercial fluid catalytic cracking (FCC) equipment and processes.

It is a further object to provide a cracking process and more preferably an FCC process with improved cracking catalysts which yield higher octane gasoline than conventional cracking catalysts.

It is a further object to conduct an FCC process with catalyst containing zeolite Beta that does not require the addition of hydrogen.

These and further objects will become apparent as the description of the invention proceeds.

SUMMARY OF THE INVENTION

Large pore size zeolites such as zeolite Beta and zeolite ZSM-20 can be incorporated into a cracking catalyst with unusual selectivity for producing compounds boiling in the gasoline range which contribute to high octane. These components are low molecular weight olefins produced by zeolite Beta and aromatics produced by ZSM-20. These catalysts are especially suitable to be used in fluid catalytic cracking.

These hydrocarbon conversion catalysts can be prepared employing ZSM-20 or Beta or admixtures of ZSM-20 and Beta as the primary catalytic ingredient. The primary, large pore zeolite is mixed in a matrix to form a catalyst particle. The matrix will preferably contain a binder such as silica, alumina, silica-alumina or mixtures of these materials. The matrix can optionally also contain conventional cracking catalyst adjuvents such as clay and/or aluminas. These adjuvents are well known in the art of FCC. The zeolite Beta or ZSM-20 in the final catalyst preferably will be in the low sodium, H+ form. In another embodiment these catalysts can further have incorporated therein one or more secondary zeolites such as X-type faujasite, Y-type faujasite, ferrierite or mordenite. When the secondary zeolite is used the amount of the primary, large pore zeolite is preferably equal to or greater than the amount of the secondary zeolite. Our preferred hydrocarbon conversion catalysts which employ Beta, ZSM-20 or mixtures thereof when used in an FCC process yield a higher octane gasoline or more improved gasoline than conventional FCC catalysts.

When using a Y-type faujasite as the auxiliary zeolite it can be used in many different forms. For example, it can be used in the as-synthesized form, in the hydrogen ion-exchanged form (HY), in the partially dealuminated form (USY), in the calcined rare earth exchanged form (CREY), in the rare earth exchanged form (REY), in the rare earth and hydrogen ion-exchanged (H, RE)Y form having a low content of $Na_2O$, which is the coke selective sieve form (CSS), and in various mixtures of these forms.

DESCRIPTION OF THE PREFERRED EMBODIMENTS

We have produced a superior cracking catalyst which has the desired selectivity for making a high octane gasoline. The catalyst particle contains from a catalytically effective amount for catalytic cracking up to 80% by weight of a primary, large pore zeolite such as zeolite Beta or zeolite ZSM-20 which is preferably exchanged to below 0.5% $Na_2O$ in the case of ZSM-20 or to below 0.3% $Na_2O$ in the case of Beta. The primary zeolite is mixed in a matrix to form the catalyst particles. The matrix contains at least a binder such as silica, alumina, silica-alumina or other conventional FCC binders. It can also contain other conventional cracking catalyst adjuvents such as clays, aluminas, etc. Examples of ranges of materials contemplated by this invention include 10-80% by total weight of the primary zeolite and the remaining matrix can be made of 5-30% by total weight of binder and 5 to 70% by total weight of conventional FCC adjuvents such as clay.

These two preferred primary zeolites are clearly distinguished from the previously used zeolite ZSM-5 for at least three reasons. The first is that the X-ray powder diffraction patterns of Beta and ZSM-20 are clearly different from ZSM-5 and from each other. Second, the nitrogen BET method surface area of ZSM-5 is only 400±40 m²/g while for Beta and ZSM-20 it is 750±100 m²/g using the Digisorb Instrument manufactured by Micromeritics, Inc., Norcross, Ga. and a $p/p_o$ range of about 0.01-0.06. The higher surface area of Beta and ZSM-20 shows that both of them have more internal pore volume than ZSM-5. The third reason is that Beta and ZSM-20 sorb at the maximum about 12-20% cyclohexane while ZSM-5 sorbs only about 2-6%. See U.S. Pat. No. 4,476,330 where the following cyclohexane adsorption property of ZSM-5 and Beta after calcination to remove organic matter is given.

| Zeolite | Cyclohexane Adsorption wt % |
| --- | --- |
| ZSM-5 | 5.1 |
| Beta | 19.3 |

This demonstrates that Beta and ZSM-20 have openings about 7-8 Angstrom units in diameter in order to sorb so much cyclohexane since the kinetic diameter of cyclohexane is about 6.0 Angstrom units (D. W. Breck, Zeolite Molecular Sieves, published by John Wiley & Sons in 1974, p. 636). The low sorption on ZSM-5 of cyclohexane means that the pores of ZSM-5 have openings less than 7-8 Angstrom units and most likely about 5.5-6 Angstrom units in diameter.

Zeolites Beta and/or ZSM-20 are synthesized according to previously disclosed techniques. See, for example, U.S. Pat. No. 3,308,069 which describes the production of zeolite Beta and European Patent Application EP 12572 which describes the production of ZSM-20. Each is then calcined to remove the occluded organic template which is trapped in the pores of the zeolite during the synthesis process. The template is not only trapped in the pores of the zeolite, but tends to block the free access of hydrocarbon molecules. Therefore, calcination may be employed to remove the organic matter and open the pores of the zeolite making the pores more accessible to hydrocarbon molecules for hydrocarbon conversion reactions.

After calcination the zeolite is conventionally ion exchanged with ammonium ion to a low content of sodium ($Na^+$) ions; the amount of sodium ions in the zeolite is commonly measured as weight percent sodium oxide or soda (% $Na_2O$). After activation at 550° C. for 2 hours the Beta zeolite becomes low soda hydrogen Beta ($LS-H^+$-Beta) and the ZSM-20 becomes low soda hydrogen ZSM-20 ($LS-H^+$-ZSM-20) It is understood by those skilled in the art that tetramethyammonium ion, $(CH_4)_4N^+$, or other organic or inorganic ions may be suitable to reduce the sodium ion content of the zeolite by ion exchange.

The $LS-H^+$- zeolites then can be incorporated into matrix mixtures with water, binder, and any conventional FCC catalyst adjuvants to make various size catalyst particles. When making an FCC catalyst a slurry can be made which may be spray dried to form the catalyst particles. When making small particles for fluid catalytic cracking (FCC) it is preferable to form the particles with a size of from about 10 to 200 micrometers. The conversion of the Beta and ZSM-20 to the $LS-H^+$- form before incorporation into the slurry to be spray dried is convenient when the spray dried catalyst will not be washed and/or ion-exchanged after spray drying. Obviously, the zeolite containing the template could be added to the slurry to be spray dried; then the particles formed by spray drying could be calcined and then ion-exchanged to a low soda form. Also, the zeolite could be calcined before it was added to the slurry to be spray dried, and the spray dried particles could be ion-exchanged and/or washed to a low soda form.

A wide range of binders can be used to form the active zeolite(s) into catalyst particles according to the present invention. Before the introduction of zeolites in cracking catalysts, catalyst particles were made of a conventional acid leached clay or silica-alumina gel or a clay catalyst in combination with the silica-alumina gel where the clay was bound or glued together by the silica-alumina gel itself. In these early catalysts the silica-alumina gel and/or acid leached clay served both as the most active component of the catalyst particle and as the binder. When zeolites were introduced as an active component of a cracking catalyst particle, new binders, or glues, were sought to extend the range of materials which would produce a stable enough and hard enough catalyst particle. As a result, in addition to silica-alumina gel, other binders such as silica, alumina, and other materials have been developed to produce a stable and hard catalyst particle composed of a zeolite and binder. These catalyst particles may incorporate further adjuvents such as clays, aluminas, silica-aluminas, and/or other substances to enhance or modify the cracking process. When making the catalysts according to the present invention which employ zeolite Beta or ZSM-20, it is contemplated that these same conventional materials can also be used.

Other large and medium pore zeolites can also be added to the catalyst composition as a secondary zeolite in an amount of from about 1-30% by weight. In the preferred embodiment the primary, large pore zeolite would be present in an amount equal to or greater than the amount of the secondary zeolite. Examples of the secondary zeolite are ferrierite, mordenite, X-type faujasite and various forms of Y-type faujasite. The Y-type faujasite may be either in the form as synthesized or in its various treated forms such as hydrogen ion-exchanged form (HY), ultrastable Y (USY) where it has been partially dealuminated, rare earth exchanged Y (REY) where the sodium form of the zeolite has been ion-exchanged with a rare earth element ion or mixture of rare earth ions, calcined rare earth exchanged Y (CREY) where the REY has been calcined, and coke selective sieve (CSS) where the Y-type zeolite has been ion exchanged such that after calcination it is a (H, RE)Y containing about 5-8% $Re_2O_3$ and less than about 2% $Na_2O$. See U.S. Pat. Nos. 3,595,611; 3,607,043 and 3,957,623, the entire contents of which are incorporated herein by reference, which further describe these CSS materials.

The catalysts made according to the present invention can be evaluated by a microactivity test which affords a convenient examination of a small quantity of catalyst. Such a test is described in Example 4 below which is a modification of the test procedure published by F. G. Ciapetta and D. S. Henderson entitled "Microactivity Test for Cracking Catalysts", Oil and Gas Journal, Vol. 65, pages 88-93, Oct. 16, 1967. Microactivity tests are routinely used in the petroleum industry to evaluate cracking catalysts in the laboratory. Such microactivity test afford a convenient and relatively rapid evaluation of a small quantity of FCC catalysts; a detailed description of a standard microactivity test similar to ours is ASTM Test D3807-80.

FCC catalysts based on ultrastable Y type (USY) zeolites are well known in the art to make gasoline which have a higher octane number than FCC catalysts based on rare earth exchanged Y (REY) or calcined rare earth exchanged Y (CREY). When compared to the conventional FCC USY-type catalyst such as Octacat ® made by the Davison Chemical Co. Division of W. R. Grace & Co., we have found that cracking catalysts employing LS-H+-Beta or employing LS-H+-ZSM-20 are able to make
a) more high octane $C_6$ and $C_7$ olefins,
b) less low octane light and heavy paraffins, and
c) as a result of (a) and (b) above, the Beta catalyst has a higher motor octane and higher research octane while the ZSM-20 catalyst has equivalent octane to the USY catalyst with more aromatics.

Having described the basic aspects of our invention, the following examples are given to illustrate specific embodiments thereof.

EXAMPLE 1

This example illustrates the preparation of Zeolite Beta and H+-Beta.

Zeolite Beta was synthesized as follows. 52 g. of sodium aluminate solution (21.4% $Al_2O_3$:18.2% $Na_2O$) was added to 848 g of a 40% solution of tetraethylammonium hydroxide. The solution was mixed in a Hamilton Beach blender. Next, 694 g tetraethylorthosilicate was added in the blender and mixing was continued for three minutes. The mixture was transferred to a one gallon polypropylene bottle and heated at 100°±1° C. to crystallize the zeolite for 14 days. After 14 days, the product was filtered off, washed free of mother liquor and dried at 105°-110° C. for 12-24 hours. The product was found to be zeolite Beta because its X-ray powder diffraction pattern matched that of the zeolite Beta disclosed in U.S. Pat. No. 3,308,069.

The zeolite Beta was calcined at 593° C. for one hour to burn out the quaternary ammonium compound. It was then cooled to room temperature; 50 g was ion exchanged with 500 ml of 10% ammonium sulfate solution at 90°-100° C. for one hour. The zeolite was filtered on a Buchner filter; the filter cake was washed with two 250 ml portions of hot deionized water. Then, a second ammonium sulfate exchange was done. The product was filtered with hot, deionized water until the filtrate was free of sulfate ions. The zeolite was then dried at 105°-110° C. for 12-24 hours followed by calcination at 538° C. for two hours.

The product was allowed to cool to room temperature. The zeolite again was twice ammonium sulfate exchanged as described above. X-ray diffraction analysis showed good retention of crystallinity. Chemical analysis were done after each step; the results are given in Table I.

TABLE I

| | Chemical Analysis of Zeolite Beta | | |
|---|---|---|---|
| Step Wt. % | Beta As Synthesized Then Calcined | Na+—H+ Beta After 2 Ammonium Sulfate Exchanges | H+-Beta After Calcination and Two More Ammon. Sulf. Exch. |
| $Na_2O$ | 5.0 | 1.1 | 0.2 |
| $Al_2O_3$ | 7.2 | | - |
| $SiO_2$ | 87.8 | | |

EXAMPLE 2

This example illustrates the preparation of ZSM-20.

Zeolite ZSM-20 was prepared according to the process disclosed in European Patent Application EP 12572 published June 25, 1980, Example 19, as follows. 52 g sodium aluminate solution (21.4% $Al_2O_3$ :18.2% $Na_2O$) was added to 1296 g of a 40% solution of tetraethylammonium hydroxide and mixed well in a Hamilton Beach blender. Next, 694 g tetraethylorthosilicate was added and mixed in blender for three minutes.

The mixture was transferred to a one gallon polypropylene bottle and heated at 100°±1° C. for 21 days to crystallize zeolite ZSM-20. After 21 days, the product was filtered off, washed free of mother liquor, and dried at 105°-110° C. for 12-24 hours. The product was examined by powder X-ray diffraction and found to be ZSM-20 because the powder pattern matched that disclosed by U.S. Pat. No. 3,972,983. The ZSM-20 was calcined and twice ammonium sulfate exchanged then calcined a second time and twice ammonium sulfate exchanged again as was the zeolite Beta described in Example 1. The final H+-ZSM-20 had good retention of crystallinity.

TABLE II

| | Chemical Analyses of ZSM-20 | | |
|---|---|---|---|
| Step Wt % | ZSM-20 As Synthesized Then Calcined | Na+—H+-ZSM-20 After 2 Ammonium Sulfate Exchanges | H+-ZSM-20 After Calcination and Two More Ammon. Sulf. Exch. |
| $Na_2O$ | 6.3 | 1.5 | 0.4 |
| $Al_2O_3$ | 18.8 | | |
| $SiO_2$ | 82.3 | | |

EXAMPLE 3

This example illustrates the production of catalysts in small, laboratory batches made from H+-Beta, H+-ZSM-20, and CREY.

A catalyst was made by blending fine powders of H+-Beta and alumina which is a form of AlO(OH) disclosed by U.S. Pat. No. 4,154,812 in such proportions that the composition of the blended powder on a dry basis was 10% H+- Beta
90% $Al_2O_3$ The alumina powder was placed in the mixing cup of a Hamilton Beach blender. The blender was turned on a low speed, and the H+-Beta was slowly added. Then, the top of the blender was put on, and the speed of the blender was increased. Blending was continued for three minutes. The well-mixed powder was fed into a Stokes Model 511-5 tablet machine to a die which has a diameter of 4.0 millimeters. Tablets were made which were then crushed to a coarse powder and sieved through a screen which has 0.250 millimeter openings. The particles which passed through the 0.25 millimeter screen and which were caught on a screen which had 0.105 millimeter openings were designated Catalyst A.

A catalyst composed of H+-ZSM-20, alumina, and kaolin clay was prepared in a similar manner; the catalyst was designated Catalyst B. The dry basis composition of Catalyst B was 10% H+-ZSM-20
60% $Al_2O_3$
30% Clay (anhydrous)

A third catalyst was made from a commercial sample of calcined, rare earth ion exchanged Y zeolite (CREY), which had been ammonium sulfate exchanged after calcination. The partial chemical analysis was $Na_2O = 0.8\%$
$RE_2O_3 = 15.9\%$
$SiO_2/Al_2O_3$ mole ratio = 4.9±0.1.

The low sodium CREY was mixed with kaolin in such proportions that the final calcined mixture was 10% low sodium CREY: 90% anhydrous clay. The kaolin was Natka clay supplied by the National Kaolin Co. The mixture was mixed in a Simpson Model LF Style US Mix-Muller for 30 minutes to completely blend the powder. Then the powder wad dampened to a thick paste with deionized water and the paste placed in the hopper of a Bonnot 2¼" (5.7 cm) diameter extruder and extruded through a ⅛" (32 mm) die. The extrudates were dried at 171°-190° C. and then crushed to coarse powder. The coarse powder was sieved to obtain particles in the size range for a fluidized catalyst as in Example 1. This was designated Catalyst C. Catalyst C is not a catalyst of the present invention, but is included as an example of a typical commercial cracking catalyst composition.

EXAMPLE 4

This example illustrates the testing of the catalysts made in Example 3.

Each of the three Catalysts A, B and C made in Example 3 were tested for catalytic cracking of a petroleum feedstock using a microactivity test which is a modification of the test procedure published by F. G. Ciapetta and D. S. Henderson entitled "Microactivity Test for Cracking Catalysts", Oil and Gas Journal, Vol. 65, pages 88-93, Oct. 16, 1967. Microactivity tests are routinely used in the petroleum industry to evaluate cracking catalysts in the laboratory. The petroleum fraction which was cracked over these catalysts was a West Texas Heavy Gas Oil (WTHGO) using the following test conditions:

Temperature 499° C.
Weight Hourly Space Velocity (WHSV) 16;
Catalyst to oil ratio 3. Since the three catalysts have 10% active zeolite, the overall space velocity value 16 becomes at least 160 when based on the active zeolite component. The WTHGO (1.67 g) was passed through 5.0 g of catalyst in 1.3 minutes. The products were collected (syncrude) and the percent conversion of gas oil into hydrogen, light gases, gasoline range hydrocarbons (such as paraffins, olefins and aromatics having boiling points between 15° C. and 216° C.), light cycle oil (LCO), heavy cycle oil (HCO) and bottoms which boil above 338° C. was calculated using a quantitative gas chromatography procedure. These results are given in Table III.

The blending octane numbers for a variety of hydrocarbons have been measured under the American Petroleum Institute API Research Project 45 and published by the American Society for Testing Materials (ASTM). The gasoline range material produced by catalysts A, B and C was analyzed by gas chromatography using a 50 meter fused silica methyl silicone coated capillary column. Compounds in the gasoline cut range of the cracked product such as methyl pentanes, hexane, methyl hexanes, hexenes, heptenes, ethylbenzene, etc. were identified and quantitively measured. Quantitative measurement of the amounts of selected hydrocarbon compounds in the gasoline cut along with the relative octane potential of each compound as described by the ASTM publication allows the estimation of selectivities of each catalyst for octane producing components. Catalysts A and B have greater selectivity for $C_6$ and $C_7$ olefins which impart a good octane number to gasoline compared to the selectivity of the conventional Catalyst C. In addition Catalysts A and B made less selected light and heavier paraffins than Catalyst C. These paraffins are

| "light" paraffins | dimethylpentane | n-hexane |
| | 2-methylpentane | methylcyclopentane |
| | 3-methylpentane | |
| "heavier" | 2-methylhexane | |
| paraffins | 3-methylhexane | |
| | n-heptane | |

Both the light and heavier paraffins have relatively poor octane numbers. The totals of $C_6$, $C_7$ and $C_8$ aromatic compounds were about the same for each catalyst. These compounds are benzene, toluene, and o-, p- and m-xylene.

The amounts of the gasoline range hydrocarbons produced by each catalyst are shown in Table IV. It can be clearly seen in Table IV that the catalysts made with Beta and ZSM-20 zeolites, Catalysts A and B respectively, yield more olefins and less light and heavy paraffins in the gasoline product compared to the conventional Catalyst C based on CREY.

Table III shows that while Catalysts A and B yield close to the same % of $C_5^+$ gasoline as the conventional Catalyst C based on CREY, Catalysts A and B give substantially more $C_3$ and $C_4$ compounds, especially $C_4$ compounds, which are valuable commercial products. Also, Catalyst B cracks bottoms (hydrocarbons boiling above 338° C.) more efficiently than conventional Catalyst C. Since the hydrocarbons boiling above 338° C. are less valuable than those boiling below 338° C., reduction of the 338° C.+ yield is a desirable commercial property of a cracking catalyst.

TABLE III

Long Microactivity (MA) Tests of Fresh High Silica Zeolite Catalysts[1]

| Catalyst | A | Delta A Compared to C | B | Delta B Compared to C | C |
|---|---|---|---|---|---|
| Zeolite | Beta | | ZSM-20 | | CREY |
| Zeolite Form | LS—H+-Beta | | LS—H+-ZSM-20 | | LS-CREY |
| Catalyst Composition (d.b.) | | | | | |
| % Zeolite | 10 | | 10 | | 10 |
| % $Al_2O_3$ | 90 | | 60 | | — |
| % Clay | — | | 30 | | 90 |
| Std. Conv., % | 62 | | 69 | | 60 |
| Mod. Conv. (incl. LCO), % | 70 | | 80 | | 72 |
| $H_2$, W % | 0.14 | | 0.35 | | 0.31 |
| $C_1$, W % | 0.49 | | 1.23 | | 0.54 |
| Tot. $C_2$, W % | 1.62 | | 2.46 | | 1.44 |
| Tot. $C_1 + C_2$, W % | 2.11 | | 3.70 | | 1.98 |
| $C_3^=$, % | 6.7 | | 7.0 | | 5.1 |
| $C_3$, % | 3.0 | | 3.1 | | 2.2 |
| Tot. $C_3$, % | 9.7 | +2.4 | 10.0 | +2.7 | 7.3 |
| $C_3^=$/Tot. $C_3$, % | 69 | | 70 | | 70 |
| $C_4^=$, % | 10.9 | +6.7 | 5.5 | +1.3 | 4.2 |
| $iC_4$, % | 7.2 | +1.6 | 7.4 | +1.8 | 5.6 |
| $nC_4$, % | 2.9 | +0.7 | 4.2 | +2.0 | 2.2 |
| Tot. $C_4$, % | 21.0 | +9.0 | 17.0 | +5.0 | 12.0 |
| $C_4^=$/Tot. $C_4$, % | 52 | | 32 | | 35 |
| $iC_4^=$/Tot. $C_4$, % | 34 | | 44 | | 47 |
| $C_5^+$ Gasoline, % | 43.2 | −3.3 | 45.4 | −1.1 | 46.5 |
| $C_5^+$ Gaso./Std. Conv. | 0.69 | | 0.66 | | 0.77 |
| Light Cycle Oil, % | 8.0 | −3.7 | 10.6 | −1.1 | 11.7 |
| LCO/Std. Conv. | 0.13 | | 0.15 | | 0.19 |
| Tot. G + D, % | 51.2 | −6.9 | 56.0 | −2.1 | 58.1 |
| 338° C.+ Bottoms, % | 29.6 | +1.5 | 20.3 | −7.8 | 28.1 |
| Coke, Wt. % Cat. | 1.1 | | 2.7 | | 2.0 |
| Coke, WT. % Feed | 3.3 | | 8.2 | | 6.1 |
| Std. Conv./Coke | 18.7 | | 8.5 | | 10.0 |

[1]MA Conditions 499° C.; C/O 3.0, WTHGO Feed, WHSV 16.

TABLE IV

Comparison of Yield Octane Enhancing Compounds in Gasoline from Catalysts Tested Fresh

| Catalyst | A | Delta of A Compared to C | B | Delta of B Compared to C | C |
|---|---|---|---|---|---|
| Zeolite Used in Catalyst | H+-Beta | | H+-ZSM-20 | | CREY |
| Catalyst Composition | | | | | |
| Wt. % Zeolite | 10 | | 10 | | 10 |
| Wt. % Alumina | 90 | | 60 | | — |
| Wt. % Clay | — | | 30 | | 90 |
| Wt. %, Selected Compounds in Cracked Product Gasoline | | | | | |
| A. Total $C_6$ Olefins | 4.4 | +1.9 | 3.2 | +0.7 | 2.5 |
| B. Total Light Paraffins | 6.6 | −4.2 | 5.1 | −5.7 | 10.8 |
| C. A/B | 0.66 | | 0.62 | | 0.23 |
| D. Total $C_7$ Olefins | 2.5 | +0.2 | 2.3 | 0.0 | 2.3 |
| E. Heavier Paraffins | 2.8 | −5.2 | 2.6 | −5.4 | 8.0 |
| F. D/E | 0.89 | | 0.88 | | 0.2 |
| G. Total $C_6$, $C_7$, $C_8$ Aromatics | 18.1 | | 19.3 | | 19.3 |
| H. G/E | 6.5 | | 7.4 | | 2.4 |
| $C_4^=$, % | 10.9 | +6.7 | 5.5 | +1.3 | 4.2 |
| $iC_4$, % | 7.2 | +1.6 | 7.4 | +1.8 | 5.6 |
| $nC_4$, % | 2.9 | +0.7 | 4.2 | +2.0 | 2.2 |
| Tot. $C_4$, % | 21.0 | +9.0 | 17.0 | +5.0 | 12.0 |
| $C_4^=$/Tot. $C_4$, % | 52 | | 32 | | 35 |
| $iC_4^=$/Tot. $C_4$, % | 34 | | 44 | | 47 |
| $C_5^+$ Gasoline, % | 43.2 | −3.3 | 45.4 | −1.1 | 46.5 |
| $C_5^+$ Gaso./Std. Conv. | 0.69 | | 0.66 | | 0.77 |
| Light Cycle Oil, % | 8.0 | −3.7 | 10.16 | −1.1 | 11.7 |
| LCO/Std. Conv. | 0.13 | | 0.15 | | 0.19 |
| Tot. G + D, % | 51.2 | −6.9 | 56.0 | −2.1 | 58.1 |
| 338° C.+ Bottoms, % | 29.6 | +1.5 | 20.3 | −7.8 | 28.1 |

TABLE IV-continued
Comparison of Yield Octane Enhancing Compounds in Gasoline from Catalysts Tested Fresh

| Catalyst | A | Delta of A Compared to C | B | Delta of B Compared to C | C |
|---|---|---|---|---|---|
| Coke. Wt % Cat. | 1.1 | | 2.7 | | 2.0 |
| Coke. WT % Feed | 3.3 | | 8.2 | | 6.1 |
| Std Conv./Coke | 18.7 | | 8.5 | | 10.0 |

EXAMPLE 5

A catalyst was made from $H^+$-Beta zeolite which was synthesized and converted to the $H^+$ form as given in Example 1. The composition (dry basis) of the catalyst was
20 wt % $H^+$-Beta
65 wt % Anhydrous clay
15 wt % Alumina Binder ($Al_2O_3$)
A slurry was made by blending 982 g. $H^+$-Beta (loss on ignition=8.3%; $Na_2O$=0.01%) in 2 liters of deionized water in a Waring blender (4 liter cup size). Then 2,553 g. aluminum hydroxychloride sol (23.5% $Al_2O_3$) was put into a 40 liter stainless steel tank. Next, 3,067 g. Natka brand kaolin clay (loss on ignition=15.2%) was slurried in the solution. Then the slurry of $H^+$-Beta was added to the slurry of clay in the tank with vigorous mixing. This mixture was spray dried in a Bowen spray dryer using an inlet temperature of 316° C. and an outlet temperature of 149° C. under a pressure of 1.7 bar. The spray dried material was then calcined in air at 538° C. for 2 hours.

EXAMPLE 6

A catalyst was made using $H^+$-ZSM-20 in a manner similar to the previous catalyst. The composition of the catalyst (dry basis) was
20 wt % $H^+$-ZSM-20
65 wt % Anhydrous Clay
15 wt % Alumina Binder ($Al_2O_3$)
The slurry to be spray dried was composed of 1586 g. $H^+$-ZSM-20 (loss on ignition=49.5%; $Na_2O$=0.1%), water, 3067 g. Natka brand kaolin clay (loss on ignition=15.2%), and 2553 g. aluminum hydroxychloride sol (23.5% $Al_2O_3$). The spray drying conditions and calcination conditions were the same as in the previous example.

EXAMPLE 7

As a comparison to our catalyst employing $H^+$-Beta and the one employing $H^+$-ZSM-20, a catalyst using Ultrastable Y type (USY) zeolite was made in a similar manner. FCC catalysts based on USY are well known in the art to make gasoline which has a higher octane number than FCC catalysts based on rare earth exchanged Y (REY) or calcined rare earth exchanged Y (CREY). The catalyst containing USY was made in the manner of the previous two examples. Its composition was
20 wt % USY
65 wt % Anhydrous clay
15 wt % Alumina binder ($Al_2O_3$)
The slurry to be spray dried was composed of 986 g. USY (loss on ignition=18.7%; $Na_2O$=0.2%), water, 3067 g. Natka brand kaolin clay (loss on ignition=15.2%), and 2553 g. aluminum hydroxychloride sol (23.5% $Al_2O_3$). The spray drying conditions and calcination conditions were the same as in the previous example.

EXAMPLE 8

Example 8 was a commercial FCC catalyst, Davison Octacat ®, made from USY and which makes a higher octane gasoline than a comparable catalyst based on REY or CREY.

EXAMPLE 9

Catalysts prepared according to examples 5, 6, 7, and 8 were evaluated for cracking of a typical FCC oil feedstock, a Midcontinent Gas Oil. The properties of this feedstock are given in Table V.

TABLE V

| Midcontinent Gas Oil Feedstock Properties | |
|---|---|
| °API @ 15.5° C. | 23.8 |
| Specific Gravity @ 15.5° C. | 0.9114 |
| Aniline Point, °C. | 98.6 |
| Sulfur: W % | 0.59 |
| Nitrogen: W % | 0.078 |
| Concarbon: W % | 0.40 |
| Metals, ppm: | |
| Ni | 0.3 |
| V | 0.8 |
| Fe | 2 |
| Cu | 0.3 |

| ASTM D-1160 Distillation | |
|---|---|
| V % | Temp. °C. @ 760 mmHg |
| IBP | 187 |
| 5 | 338 |
| 10 | 372 |
| 20 | 403 |
| 30 | 423 |
| 40 | 440 |
| 50 | 453 |
| 60 | 470 |
| 70 | 486 |
| 80 | 505 |
| 90 | 532 |
| 95 | 546 |
| FBP (97) | 550 |

UOP "K" Factor=11.9
The catalysts were deactivated by steaming at atmospheric pressure using 100% steam for 2 hours at 760° C. The cracking conditions in the pilot plant reactor which was a fixed, fluidized bed unit were
510° C. Reactor temperature
677° C. Regenerator temperature
Catalyst/Oil Ratio varied from 2-6
Weight Hourly Space Velocity varied from 20-59. Since Catalysts 5 and 6 have 20% active zeolite, the lowest overall space velocity value 20 becomes at least 100 when based on the active zeolite component. The results are set forth in Table VI.

TABLE VI

| Comparison of FCC Catalysts Made by Spray Drying | | | | |
|---|---|---|---|---|
| Example | 5 | 6 | 7 | 8 |
| Catalyst Composition (dry basis) | | | | |
| Zeolite | $H^+$-Beta | $H^+$-ZSM-20 | USY | USY |
| % Zeolite | 20 | 20 | 20 | 40 |

TABLE VI-continued

Comparison of FCC Catalysts Made by Spray Drying

| Example | 5 | 6 | 7 | 8 |
|---|---|---|---|---|
| % Binder | 15 | 15 | 10 | 25 |
| % Clay | 65 | 65 | 70 | 35 |
| Conversion, Volume % | 50 | 71 | 69 | 57 | 65 |
| Gasoline, Volume % | 43 | 62 | 64 | 53 | 59 |
| Research Octane Number | 93.7 | 91.3 | 90.7 | 92.0 | 91.5 |
| Motor Octane Number | 81.8 | 80.3 | 80.4 | 80.6 | 80.4 |
| Bromine Number | 129 | 51 | 47 | 84 | 62 |
| Weight % $C_6 + C_7$ Paraffins | 6.8 | 14.4 | 14.7 | 11.1 | 12.1 |
| Weight % $C_6 + C_7$ Olefins | 18.6 | 8.4 | 8.3 | 12.0 | 10.3 |
| Weight % $C_6 + C_7 + C_8$ Aromatics | 9.4 | 11.2 | 11.2 | 10.3 | 10.5 |

The results of the cracking tests in the pilot plant reactor in Table VI clearly show the following.

$H^+$-Beta catalyst makes 2 unit research octane numbers better than the commercial USY catalysts of Ex. 8.

$H^+$-Beta catalyst makes a 1 unit motor octane advantage over the USY catalysts.

$H^+$-Beta catalyst makes only 50% of the $C_6$ and $C_7$ paraffins that USY catalysts make, while it makes 50–80% more $C_6$ and $C_7$ olefins than the USY catalysts.

The $H^+$-ZSM-20 catalyst makes a gasoline equivalent in octane number (RON and MON) to USY catalysts, but the catalyst has a greater activity than the USY catalyst and its gasoline is more aromatic than gasoline from USY catalysts.

It is understood that the foregoing detailed description is given merely by way of illustration and that many variations may be made therein without departing from the spirit of this invention.

What is claimed is:

1. A method of cracking a hydrocarbon feedstock to obtain lower boiling hydrocarbons having higher octane gasoline which comprises subjecting said feedstock to fluid catalytic cracking conditions with a space velocity based on the active zeolite component of at least 100 in the absence of added hydrogen and in the presence of a catalytic cracking catalyst having a particle size of from about 10 to 200 micrometers, said catalyst comprising zeolite Beta exchanged to a low soda level which is mixed in a matrix, said zeolite being present in a catalytically effective amount for catalytic cracking and in an amount up to 80% by weight of the total mixture.

2. A method of cracking a hydrocarbon feedstock according to claim 1, wherein the $Na_2O$ content of the zeolite Beta is below 0.3% $Na_2O$.

3. A method of cracking a hydrocarbon feedstock according to claim 1, wherein the matrix comprises at least a binder selected from the group consisting of silica, alumina, silica-alumina, clay, and mixtures thereof.

4. A method of cracking a hydrocarbon feedstock according to claim 1, wherein the catalyst further comprises a secondary zeolite in an amount of 1–30% by weight of the catalyst selected from the group consisting of X faujasite, Y faujasite, ferrierite, mordenite and mixtures thereof and wherein the amount of the zeolite Beta is equal to or greater than the amount of the secondary zeolite.

5. A method of cracking a hydrocarbon feedstock according to claim 4, wherein the secondary, Y faujasite is selected from the group consisting of the as-synthesized form, hydrogen ion-exchanged form (HY), partially dealuminated form (USY), calcined rare earth exchanged form (CREY) rare earth exchanged form (REY), rare earth and hydrogen ion-exchanged (H, Re)Y with low soda which is the coke selective sieve form (CSS), and mixtures thereof.

6. A method of increasing the octane number of FCC gasoline comprising contacting a hydrocarbon feedstock under FCC cracking conditions with a space velocity based on the active zeolite component of at least 100 in the absence of added hydrogen and in the presence of a catalytic cracking catalyst comprising zeolite Beta exchanged to a low soda level which is mixed in a matrix, said zeolite being present in a catalytically effective amount for catalytic cracking and in an amount up to 80% by weight of the total mixtures and said catalyst having a particle size of from about 10 to 200 micrometers.

7. A method of increasing the octane number of FCC gasoline according to claim 6, wherein the zeolite Beta has a $Na_2O$ content below 0.3% $Na_2O$.

8. A method of increasing the octane number of FCC gasoline according to claim 6, wherein the catalyst further comprises a secondary zeolite in an amount of 1–30% by weight of the catalyst selected from the group consisting of X faujasite, Y faujasite, ferrierite, mordenite and mixtures thereof and wherein the amount of the zeolite Beta is equal to or greater than the amount of the secondary zeolite, said catalyst having a particle size of from 10 to 200 micrometers and wherein the zeolite Beta has a $Na_2O$ content below 0.3% $Na_2O$.

9. A method of increasing the octane number of FCC gasoline according to claim 8, wherein the secondary, Y faujasite is selected from the group consisting of the as-synthesized form, hydrogen ion-exchanged form (HY), partially dealuminated form (USY), calcined rare earth exchanged form (CREY), rare earth exchanged form (REY), rare earth and hydrogen ion-exchanged (H, Re)Y with low soda which is the coke selective sieve form (CSS), and mixtures thereof.

10. A method of cracking a hydrocarbon feedstock according to claim 1, wherein the feedstock is subjected to fluid catalytic cracking conditions with a space velocity based on the active zeolite component of at least 160.

11. A method of cracking a hydrocarbon feedstock according to claim 3, wherein the alumina matrix is made from an aluminum hydroxychloride sol.

12. A method of increasing the octane number of FCC gasoline according to claim 6, wherein the matrix for the zeolite Beta is an alumina matrix made from an aluminum hydroxychloride sol.

* * * * *